US012763671B2

(12) United States Patent
Chao et al.

(10) Patent No.: US 12,763,671 B2
(45) Date of Patent: Oct. 13, 2026

(54) POWER CONVERSION SYSTEM

(71) Applicant: Ancora Semiconductors Inc., Taoyuan City (TW)

(72) Inventors: Wei-Hsiang Chao, Taoyuan City (TW); Ku-Ying Chen, Taoyuan City (TW); Hong-Sheng Wang, Taoyuan City (TW)

(73) Assignee: Ancora Semiconductors Inc., Taoyuan City (TW)

( * ) Notice: Subject to any disclaimer, the term of this patent is extended or adjusted under 35 U.S.C. 154(b) by 111 days.

(21) Appl. No.: 19/028,363

(22) Filed: Jan. 17, 2025

(65) Prior Publication Data

US 2025/0293589 A1 Sep. 18, 2025

Related U.S. Application Data

(60) Provisional application No. 63/566,071, filed on Mar. 15, 2024.

(51) Int. Cl.

| | |
|---|---|
| ***H02M 1/08*** | (2006.01) |
| ***H02M 1/00*** | (2006.01) |
| ***H02M 1/38*** | (2007.01) |
| ***H02M 3/156*** | (2006.01) |
| ***H02M 3/157*** | (2006.01) |
| ***H02M 3/158*** | (2006.01) |

(52) U.S. Cl.
CPC ......... *H02M 1/385* (2021.05); *H02M 1/0058* (2021.05); *H02M 1/083* (2013.01); *H02M 3/157* (2013.01); *H02M 3/158* (2013.01); *H02M 1/08* (2013.01); *H02M 3/156* (2013.01)

(58) Field of Classification Search
CPC ......... H02M 1/08; H02M 1/083; H02M 3/156
See application file for complete search history.

(56) References Cited

U.S. PATENT DOCUMENTS

| | | | | |
|---|---|---|---|---|
| 9,461,558 | B2 | 10/2016 | Bianco et al. | |
| 10,784,795 | B1 * | 9/2020 | Chao | H03K 17/0828 |
| 11,923,816 | B2 | 3/2024 | Arnold et al. | |
| 2016/0233788 | A1 * | 8/2016 | Osanai | H02M 7/537 |
| 2020/0321960 | A1 * | 10/2020 | Chao | H03K 17/687 |
| 2021/0028782 | A1 * | 1/2021 | Ye | H03K 17/74 |
| 2021/0105010 | A1 * | 4/2021 | Chao | H03K 17/163 |
| 2023/0139736 | A1 | 5/2023 | Giandalia et al. | |

FOREIGN PATENT DOCUMENTS

| | | | |
|---|---|---|---|
| CN | 103391016 | A | 11/2013 |
| CN | 108390549 | A | 8/2018 |

* cited by examiner

*Primary Examiner* — Gary A Nash
(74) *Attorney, Agent, or Firm* — KIRTON McCONKIE; Evan R. Witt

(57) ABSTRACT

A power conversion system includes a voltage detection circuit and a logic circuit. When the logic circuit determines that the drain-source voltage of the power switch is less than zero through the detecting terminal of the voltage detection circuit, the logic circuit outputs the first high-level voltage. Accordingly, the driving circuit outputs the second high-level voltage to the power switch according to the first high-level voltage. Consequently, the gate-source voltage of the power switch is pulled high. When the reverse current flows from the source to the drain of the power switch, the energy loss of the power switch due to the drain-source voltage of the power switch in power conversion system operated at high frequency is reduced.

10 Claims, 6 Drawing Sheets

POWER CONVERSION SYSTEM

CROSS-REFERENCE TO RELATED APPLICATION

This application claims the benefit of U.S. Provisional Application No. 63/566,071 filed on Mar. 15, 2024, and entitled "DRIVING CIRCUIT AND DETECTING CIRCUIT FOR POWER SWITCH". The entireties of the above-mentioned patent application are incorporated herein by reference for all purposes.

FIELD OF THE INVENTION

The present disclosure relates to the technical field of power conversion, and more particularly to a power conversion system.

BACKGROUND OF THE INVENTION

Metal Oxide Semiconductor Field Effect Transistor (hereinafter referred to as MOSFET) is an electronic component widely used in various power conversion application. When the MOSFET is operated in the third quadrant (i.e., the negative voltage and the negative current are applied to the MOSFET) and when the gate-source voltage Vgs of the MOSFET is less than the threshold voltage Vth of the MOSFET, the MOSFET is operated in a nonlinear region and can't be turned on completely. Consequently, an extra drain-source voltage Vds of the MOSFET is generated.

Generally, the power conversion system uses a soft-switching circuit topology. In order to avoid the short circuit caused by the switch of the upper arm and the switch of the lower arm in the half-bridge circuit being turned on at the same time, the operation of the switch (i.e., the MOSFET) is delayed for a period of time before the switch is turned on. The above-mentioned period of time is called as a dead time. If a reverse current flowing from the source to the drain of the MOSFET during the dead time, an extra drain-source voltage Vds of the MOSFET is generated. Consequently, the drain-source voltage Vds of the MOSFET may result in energy loss of the system when the power conversion system is operated at high frequency.

Therefore, there is a need of providing a power conversion system to obviate the drawbacks encountered by the prior arts.

SUMMARY OF THE INVENTION

An object of the present disclosure is to provide a power conversion system to address the issues encountered by the prior arts. If a reverse current flowing from the source to the drain of the MOSFET during the dead time, an extra drain-source voltage of the MOSFET is generated to result in energy loss of the system when the conventional power conversion system is operated at high frequency. By using the power conversion system of the present disclosure, the energy loss of the system is reduced and the efficiency of the system is enhanced.

In accordance with an aspect of the present disclosure, a power conversion system is provided. The power conversion system includes a power switch, a driving circuit, a voltage detection circuit and a logic circuit. The driving circuit has a driving input terminal and a driving output terminal, wherein the driving output terminal is electrically connected to the gate of the power switch, and the driving output terminal is configured to output a control signal to control the operation of the power switch. The voltage detection circuit is electrically connected to the drain of the power switch and the voltage source and includes a current source, a detecting switch and a detecting terminal. The current source is electrically connected between the voltage source and the detecting terminal and configured to output a detecting current along a direction toward the detecting terminal. The detecting switch is electrically connected between the detecting terminal and the drain of the power switch. The logic circuit is electrically connected to the current source, the detecting terminal, the driving circuit and the source of the power switch and includes a first logic input terminal, a second logic input terminal and a logic output terminal. The first logic input terminal is electrically connected to the current source, the second logic input terminal is configured to receive a PWM signal, and the logic output terminal is electrically connected to the driving input terminal. The logic circuit is configured to determine whether the drain-source voltage of the power switch is less than zero through the detecting terminal and output a first high-level voltage through the logic output terminal when the drain-source voltage of the power switch is less than zero, wherein the driving circuit outputs a second high-level voltage to the power switch through the driving output terminal according to the first high-level voltage. Consequently, the gate- source voltage of the power switch is pulled high.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
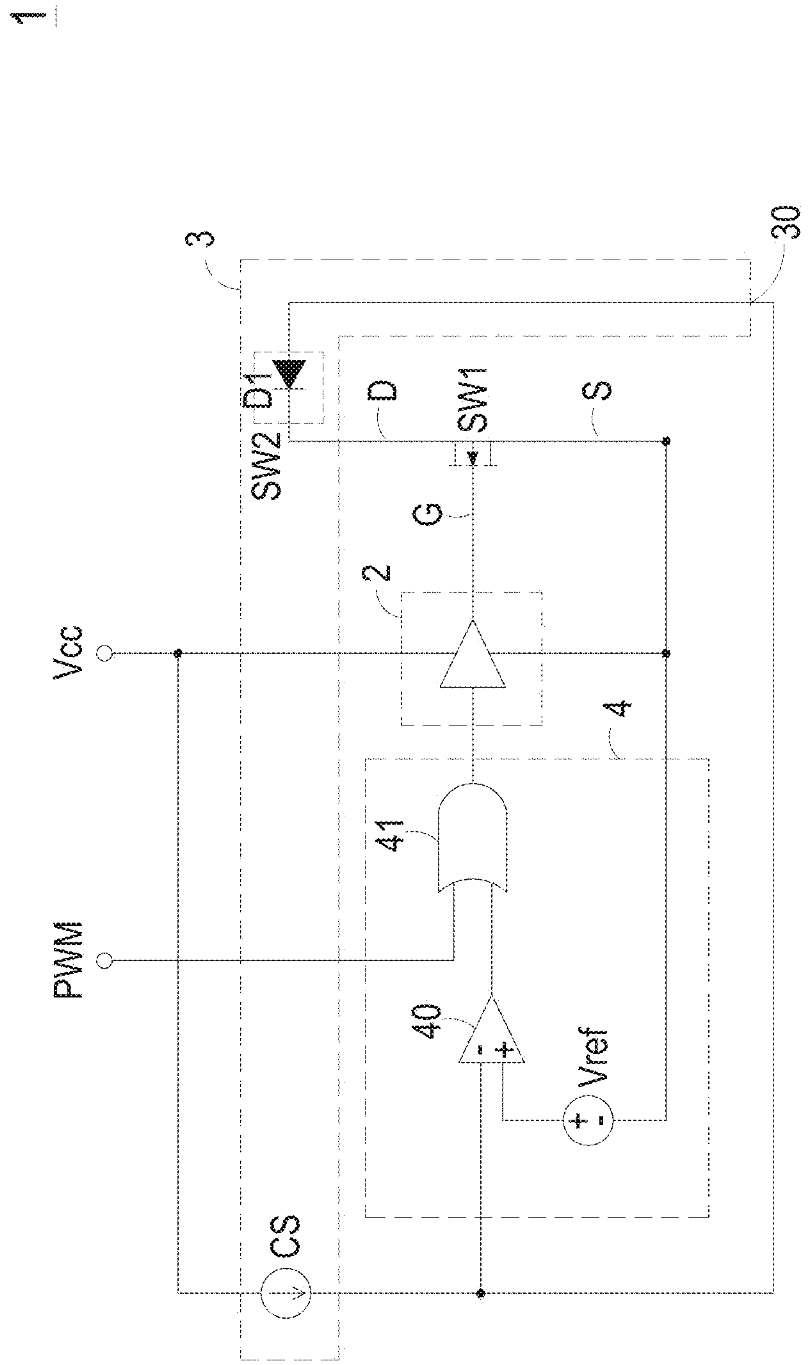
FIG. 1 is a schematic circuit diagram illustrating a circuitry topology of a power conversion system according to a first embodiment of the present disclosure.
Figure 2:
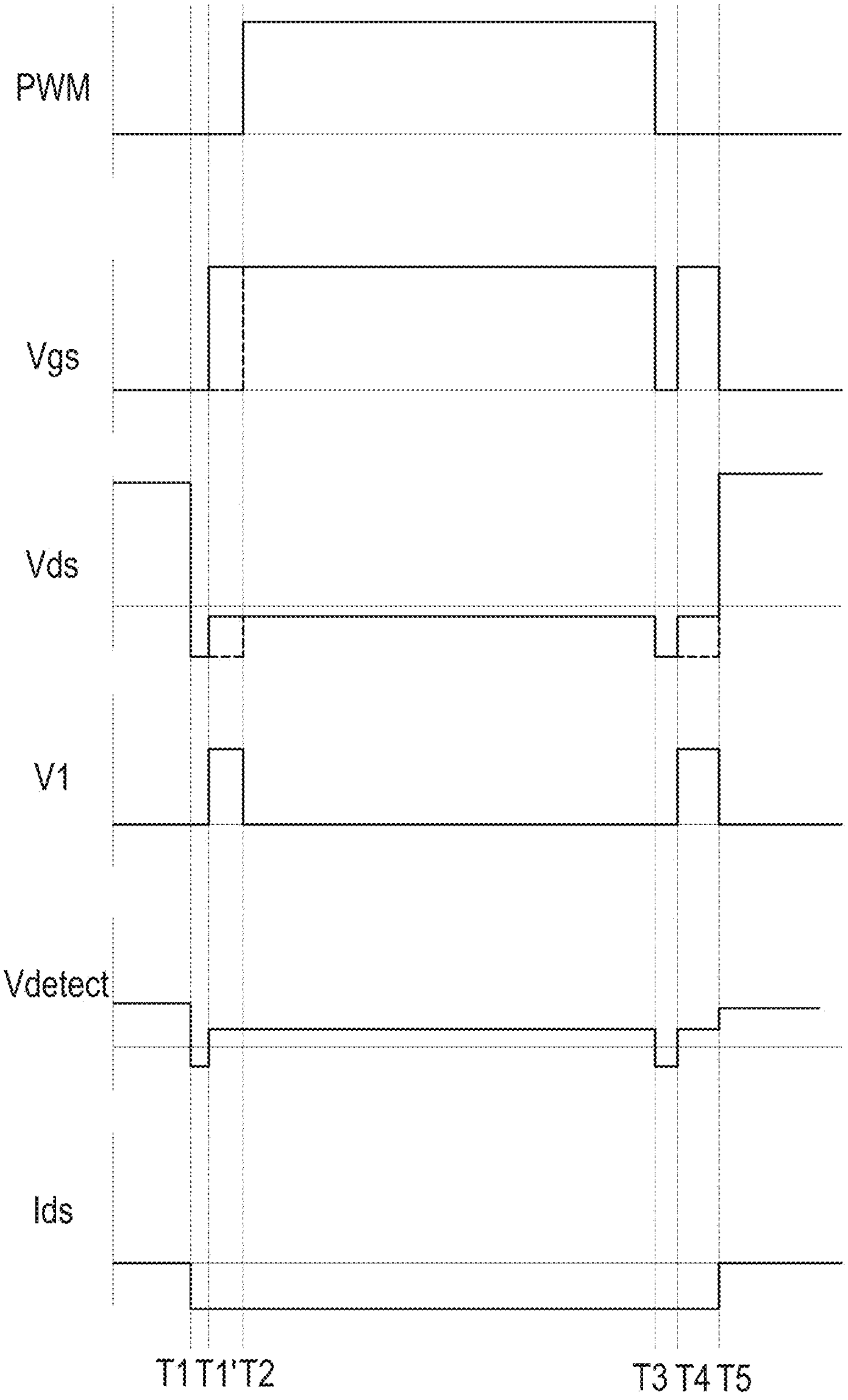
FIG. 2 schematically shows the waveforms of the operation parameters of the power conversion system of FIG. 1.

FIG. 1 is a schematic circuit diagram illustrating a circuitry topology of a power conversion system according to a first embodiment of the present disclosure. FIG. 2 schematically shows the waveforms of the operation parameters of the power conversion system of FIG. 1. As shown in FIG. 1, in the embodiment, the power conversion system 1 includes a power switch SW1, a driving circuit 2, a voltage detection circuit 3 and a logic circuit 4. Preferably but not exclusively, the power switch SW1 includes a MOSFET. The power conversion system 1 is configured to convert electric energy through the turn-on and turn-off operation of the power switch SW1.

The driving circuit 2 includes a driving input terminal and a driving output terminal. The driving output terminal of the driving circuit 2 is electrically connected to the gate G of the power switch SW1, and the driving circuit 2 is configured to output a control signal through the driving output terminal to control the turn-on and turn-off operation of the power switch SW1. The voltage detection circuit 3 is electrically connected to the drain D of the power switch SW1 and the voltage source Vcc and includes a current source CS, a detecting switch SW2 and a detecting terminal 30. The detecting terminal 30 is configured to provide detecting voltage (see FIG. 2). The input terminal of the current source CS is electrically connected to the voltage source Vcc, and the output terminal of the current source CS is electrically connected to the detecting terminal 30 and configured to output a detecting current to the detecting terminal 30. That is, the current source CS is electrically connected between the voltage source Vcc AND the detecting terminal 30. The detecting switch SW2 is electrically connected between the detecting terminal 30 and the drain D of the power switch SW1. When the detecting switch SW2 receives the detecting current from the current source CS through the detecting terminal 30, a forward conduction voltage is formed on the detecting switch SW2. In some embodiments, the detecting switch SW2 includes a diode D1. The cathode of the diode D1 is electrically connected to the drain of the power switch SW1, and the anode of the diode D1 is electrically connected to the detecting terminal 30.

The logic circuit 4 is electrically connected to the output terminal of the current source CS, the detecting terminal 30, the driving circuit 2 and the source S of the power switch SW1 and configured to receive the PWM signal. The logic circuit 4 includes a first logic input terminal, a second logic input terminal and a logic output terminal. The first logic input terminal is electrically connected to the current source CS, the second logic input terminal is configured to receive the PWM signal, and the logic output terminal is electrically connected to the driving input terminal of the driving circuit 2. The logic circuit 4 is configured to determine whether the drain-source voltage Vds of the power switch SW1 is less than zero through the detecting voltage $V_{detect}$ of the detecting terminal 30. When the logic circuit 4 determines that the drain-source voltage Vds of the power switch SW1 is less than zero, it means that the power switch SW1 is operated in the third quadrant. Under this circumstance, the logic circuit 4 outputs a first high-level voltage through the logic output terminal, and the driving circuit 2 outputs a second high-level voltage to the power switch SW1 through the driving output terminal according to the first high-level voltage. Consequently, the gate-source voltage Vgs of the power switch SW1 is pulled high to drive the power switch SW1 to turned on in advance. Therefore, the energy loss of the power switch SW1 operated in the third quadrant is reduced.

In some embodiments, the logic circuit 4 includes a comparator 40 and an OR gate 41. The inverting input terminal of the comparator 40 is electrically connected to the output terminal of the current source CS and the detecting terminal 30 and configured as the first logic input terminal. The non-inverting input terminal of the comparator 40 is electrically connected to a reference voltage source Vref. The reference voltage source Vref is electrically connected between the non-inverting input terminal of the comparator 40 and the source S of the power switch SW1. A first input terminal of the OR gate 41 receives the PWM signal and is configured as the second logic input terminal. The second input terminal of the OR gate 41 is electrically connected to the output terminal of the comparator 40. The output terminal of the OR gate 41 is electrically connected to the logic input terminal of the driving circuit 2 and configured as the logic output terminal.

In accordance with the concept of the present disclosure, the current source CS is configured to output the detecting current to the detecting switch SW2 through the detecting terminal 30. If the sum of the drain voltage of the drain D of the power switch SW1 and the forward conduction voltage Vf (not shown) of the diode D1 of the detecting switch SW2 (i.e., the forward voltage drop) is less than the voltage of the voltage source Vcc (i.e., Vd+Vf<Vcc), the detecting current flows through the detecting switch SW2 and then flows back to the source S of the power switch SW1 through the power switch SW1. Meanwhile, the detection voltage Vdetect of the detecting terminal 30 of the detecting circuit 3 is equal to the sum of the drain-source voltage Vds of the power switch SW1 and the forward conduction voltage Vf of the detecting switch SW2 (i.e., Vdetect=Vds+Vf). If the sum of the drain-source voltage Vds of the power switch SW1 and the forward conduction voltage Vf of the detecting switch SW2 is greater than the voltage of the voltage source Vcc (i.e., Vds+Vf>Vcc), the detecting voltage Vdetect of the detecting terminal 30 of the detecting circuit 3 is equal to the voltage of the voltage source Vcc (i.e., Vdetect=Vcc). According to the above-mentioned equations (i.e., the detection voltage Vdetect of the detection terminal 30 of the detecting circuit 3 is equal to the sum of the drain-source voltage Vds of the power switch SW1 and the forward conduction voltage Vf of the detecting switch SW2 (i.e., Vdetect=Vds+Vf)), the drain-source voltage Vds of the power switch SW1 is calculated by subtracting the forward conduction voltage Vf of the detecting switch SW2 from the detecting voltage Vdetect. The comparator C is used to determine whether the drain-source voltage Vds of the power switch SW1 is less than zero. When the comparator 40 determines that the drain-source voltage Vds Oof the power switch SW1 is less than zero (i.e., Vds<0), it means that the power switch SW1 is operated in the three quadrant. Meanwhile, the logic circuit 4 drives the driving circuit 2 to pull up the gate-source voltage Vgs of the power switch SW1 to the high level. Consequently, the energy loss of the power switch SW1 operated in the third quadrant is reduced.

Please refer to FIGS. 1 and 2 again. FIG. 2 schematically shows the waveforms of the PWM signal, the gate-source voltage Vgs of the power switch SW1, the drain-source voltage Vds of the power switch SW1, the output voltage V1 on the output terminal of the comparator 40, the detecting voltage Vdetect and the reverse current Ids flowing from the source to the drain of the power switch SW1. During the time interval between the time T1 and the time T1', the power switch SW1 is turned off according to the PWM signal. Consequently, the reverse current Ids flows from the source of the power switch SW1 to the drain of the power switch SW1. Meanwhile, the detecting voltage Vdetect on the detection terminal 30 of the voltage detection circuit 3 is less than the voltage of the reference voltage source Vref (i.e., Vdetect<Vref). The voltage on the driving output terminal of the driving circuit 2 is maintained at low-level voltage due to the delay of the logic circuit 4.

During the time interval between the time T1' and the time T2, the delay of the logic circuit 4 is ended. Accordingly, the output voltage V1 on the output terminal of the comparator 40 is a high-level voltage, and the logic output terminal of the logic circuit 4 outputs the first high-level voltage. Under this circumstance, the driving circuit 2 outputs the second high-level voltage to the power switch SW1 to pull up the gate-source voltage Vgs of the power switch SW1. Consequently, negative voltage of the drain-source voltage Vds of the power switch SW1 is reduced due to that the gate-source voltage Vgs of the power switch SW1 is pulled up, and the power switch SW1 is turned on in advance during the dead time.

During the time interval between time T2 and time T3, the PWM signal is a high-level signal. Through the OR gate 41 of the logic circuit 4, the driving circuit 2 is prompted to continuously output the second high-level voltage.

During the time interval between time T3 and time T4, the operations of the power conversion system is similar to that during the time interval between time T1 and time T1', and are not redundantly described hereinafter. During the time interval between time T4 and time T5, the operations of the power conversion system is similar to that during the time interval between the time T1' and the time T2, and are not redundantly described hereinafter. After the time T5, the reverse current Ids disappears. Consequently, the gate-source voltage Vgs of the power switch SW1 is changed to low-level voltage so that the power switch SW1 is turned off.

In some embodiments, the power switch SW1, the driving circuit 2, the voltage detection circuit 3 and the logic circuit 4 are integrated as a system on chip (SoC) or a system in package (Sip), but not limited thereto.

In some embodiments, the driving circuit 2 outputs the second high-level voltage to drive the power switch SW1 to be turned on completely (i.e., the second high-level voltage outputted by the driving circuit 2 is equal to the voltage of the voltage source Vcc). Alternatively, the driving circuit 2 outputs the second high-level voltage to drive the power switch SW1 to be half-conducted (i.e., the threshold voltage Vth of the power switch SW1<the second high-level voltage outputted by the driving circuit 2<the voltage of the voltage source Vcc).

Figure 3:
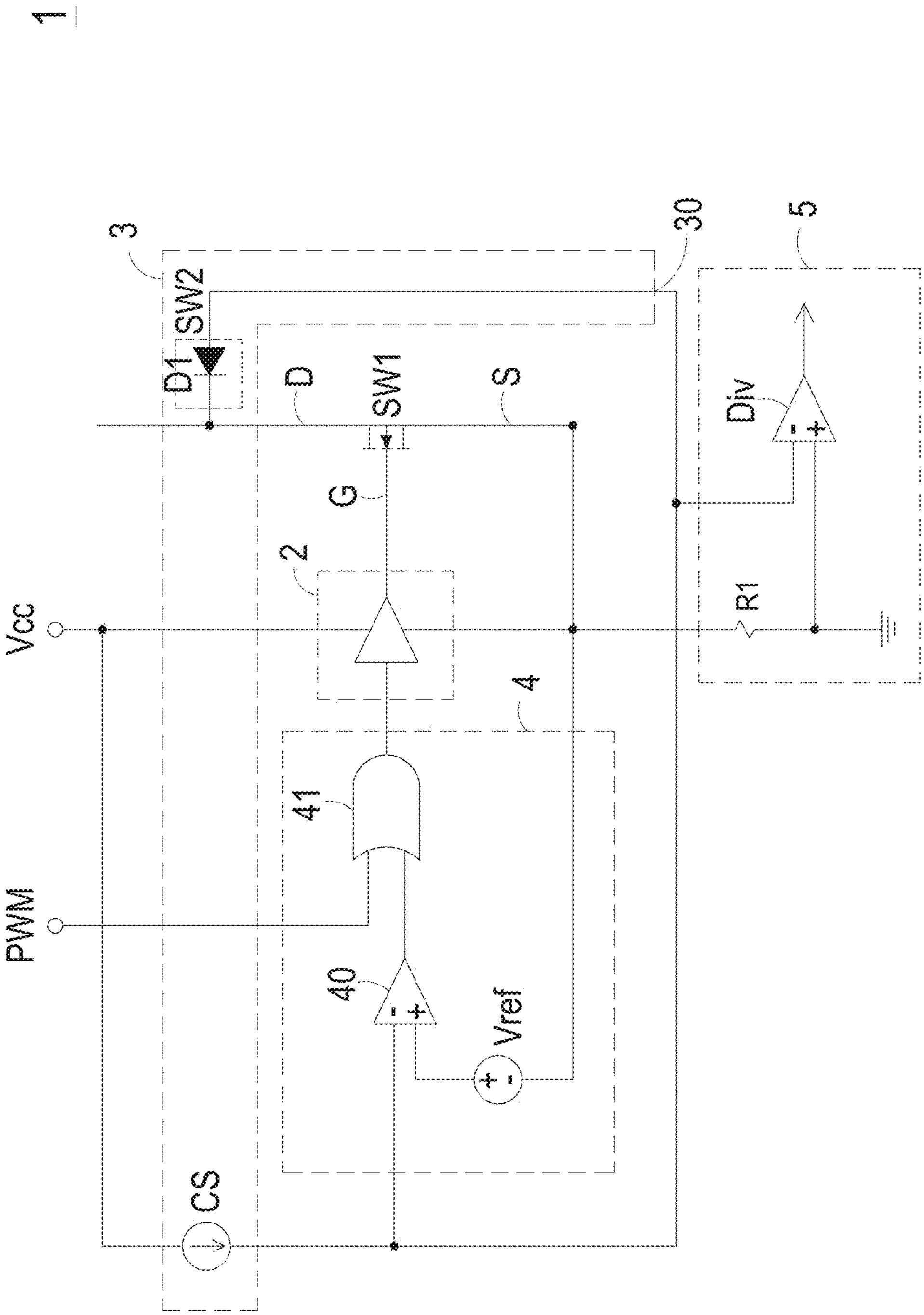
FIG. 3 is a schematic circuit diagram illustrating a circuitry topology of a power conversion system according to a second embodiment of the present disclosure.

FIG. 3 is a schematic circuit diagram illustrating a circuitry topology of a power conversion system according to a second embodiment of the present disclosure. In some embodiments, the power conversion system 1 further includes an on-resistance monitoring circuit 5. The on-resistance monitoring circuit 5 is electrically connected to the detecting terminal 30 of the voltage detection circuit 3 and the source S of the power switch SW1 and configured to monitor the on-resistance of the power switch SW1 when the power switch SW1 is operated in the first quadrant. The on-resistance monitoring circuit 5 includes a resistor R1 and a divider Div. The first terminal of the resistor R1 is electrically connected to the source S of the power switch SW1, and the second terminal of the resistor R1 is electrically connected to the ground. The first terminal of the divider Div is electrically connected to the detecting terminal 30 of the voltage detection circuit 3, the second terminal of the divider Div is electrically connected to the second terminal of the resistor R1, and the output terminal of the divider Div outputs an output signal which reflects the on-resistance of the power switch SW1.

Figure 4:
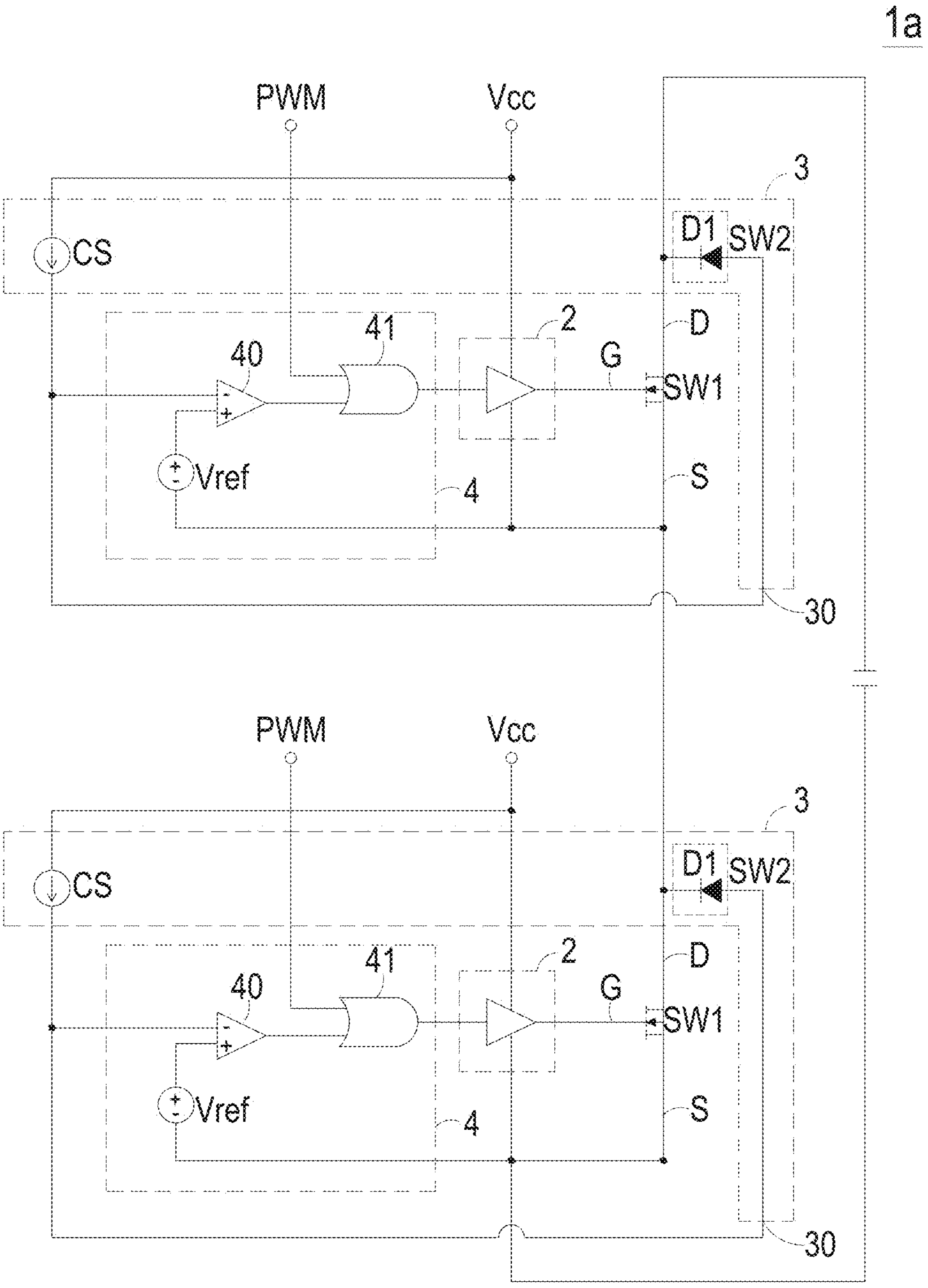
FIG. 4 is a schematic circuit diagram illustrating a circuitry topology of a power conversion system according to a third embodiment of the present disclosure.

FIG. 4 is a schematic circuit diagram illustrating a circuitry topology of a power conversion system according to a third embodiment of the present disclosure. In this embodiment, the power conversion system la includes two power switches SW1, two driving circuits 2 and two voltage detection circuits 3. The number of the power switches SW1 is corresponding to the number of the driving circuits 2 and corresponding to the number of the voltage detection circuit 3. A half-bridge circuit topology is formed by the two power switches SW1 connected in series. Each power switch SW1 is operated in conjunction with the corresponding driving circuit 2 and the corresponding voltage detection circuit 3. The connection relationships and operations among each power switch SW1, the corresponding driving circuit 2 and the corresponding voltage detection circuit 3 are similar to that of the first embodiment as shown in FIGS. 1 and 2, and are not redundantly described hereinafter. By using the power conversion system 1*a* of this embodiment, the energy loss of the two power switches SW1 operated in the third quadrant are reduced, respectively.

Figure 5:
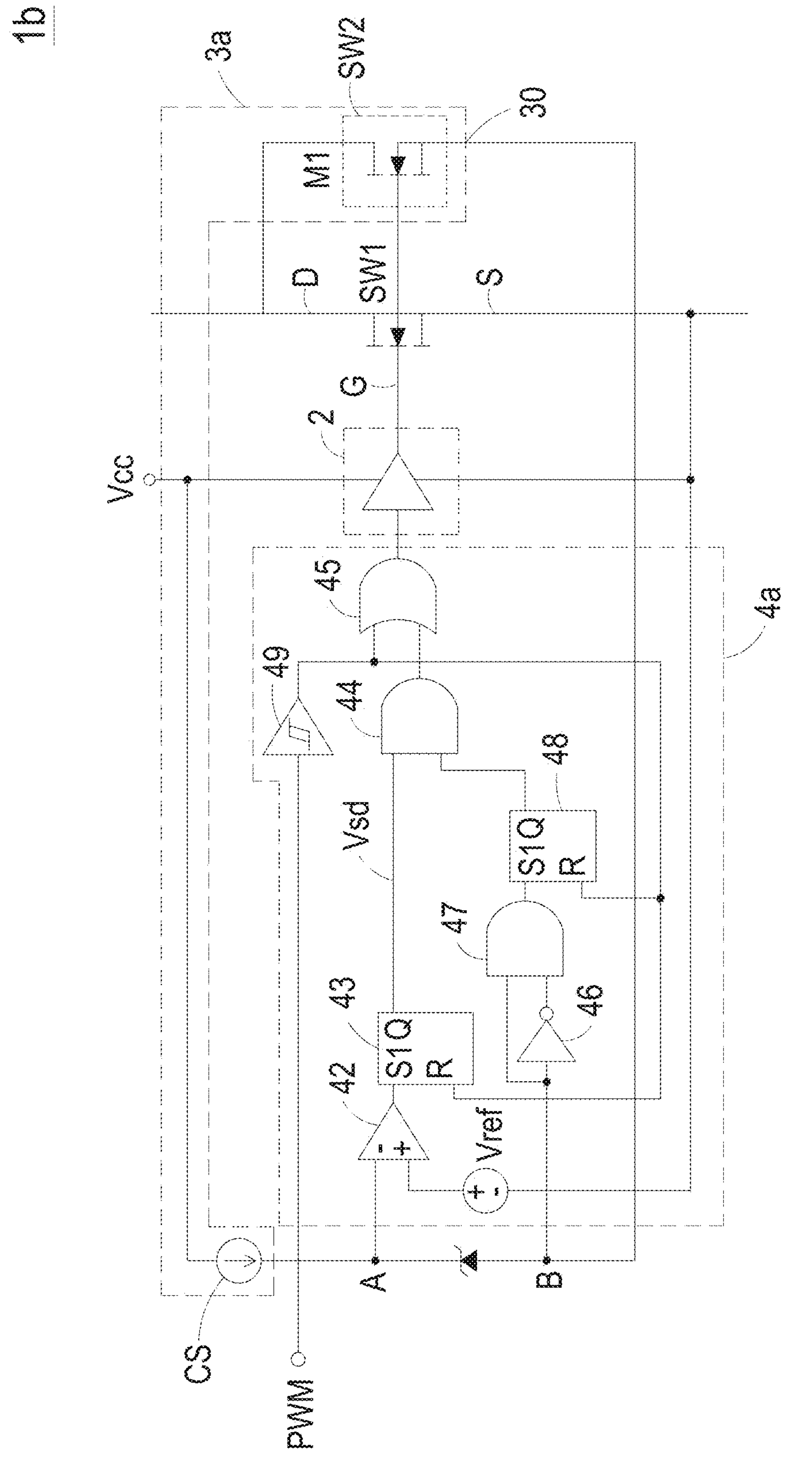
FIG. 5 is a schematic circuit diagram illustrating a circuitry topology of a power conversion system according to a fourth embodiment of the present disclosure.
Figure 6:
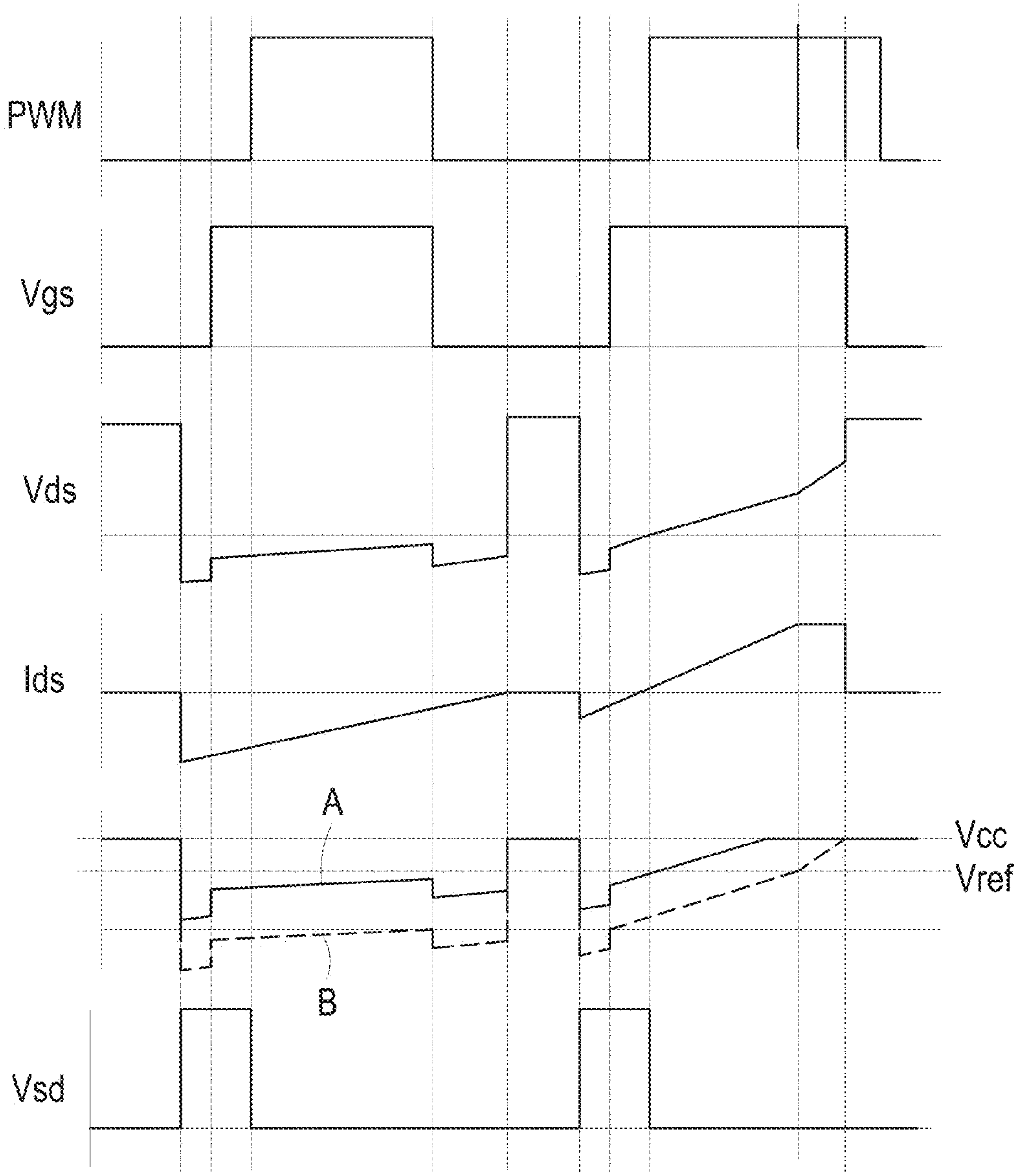
FIG. 6 schematically shows the waveforms of the operation parameters of the power conversion system of FIG. 5.

FIG. 5 is a schematic circuit diagram illustrating a circuitry topology of a power conversion system according to a fourth embodiment of the present disclosure. FIG. 6 schematically shows the waveforms of the operation parameters of the power conversion system of FIG. 5. In this embodiment, the power conversion system 1*b* includes a power switch SW1, a driving circuit 2, a voltage detection circuit 3*a* and a logic circuit 4*a*. Preferably but not exclusively, the power switch SW1 includes a MOSFET. The power conversion system 1*b* is configured to convert electric energy through the turn-on and turn-off operation of the power switch SW1.

The driving circuit 2 has a driving input terminal and a driving output terminal. The driving output terminal of the driving circuit 2 is electrically connected to the gate G of the power switch SW1, and the driving circuit 2 is configured to output a control signal through the driving output terminal to control the turn-on and turn-off operation of the power switch SW1. The voltage detection circuit 3*a* is electrically connected to the drain D of the power switch SW1 and the voltage source Vcc and includes a current source CS, a detecting switch SW2 and a detecting terminal 30. The detecting terminal 30 is configured to provide a detecting voltage Vdetect. The input terminal of the current source CS is electrically connected to the voltage source Vcc, and the output terminal of the current source CS is electrically connected to the detecting terminal 30. That is, the current source CS is electrically connected between the voltage source Vcc and the detecting terminal 30, and the current source CS is configured to output the detecting current to the detecting terminal 30. The detecting switch SW2 is electrically connected between the detecting terminal 30 and the drain D of the power switch SW1. When the detecting switch SW2 receives the detecting current from the current source CS through the detecting terminal 30, a forward conduction voltage Vf is formed on the detecting switch SW2. In some embodiments, the detecting switch SW2 includes a MOSFET M1. The gate of the MOSFET MI is electrically connected to the gate G of the power switch SW1, the drain of the MOSFET M1 is electrically connected to the drain D of the power switch SW1, and the source of the MOSFET M1 is electrically connected to the detecting terminal 30.

The logic circuit 4*a* is electrically connected to the output terminal of the current source CS, the detecting terminal 30, the driving circuit 2 and the power switch SW1 and configured to receive the PWM signal. The logic circuit 4*a* includes a first logic input terminal, a second logic input terminal and a logic output terminal. The first logic input terminal is electrically connected to the current source CS, and the voltage on the first logic input terminal is marked as the first voltage A. The second logic input terminal is configured to receive the PWM signal, and the logic output terminal is electrically connected to the driving input terminal of the driving circuit 2. The logic circuit 4 is configured to determine whether the drain-source voltage Vds of the power switch SW1 is less than zero through the detecting voltage Vdetect of the detecting terminal 30. When the logic circuit 4*a* determines that the drain-source voltage Vds of the power switch SW1 is less than zero, it means that the power switch SW1 is operated in the third quadrant. Under this circumstance, the logic circuit 4*a* outputs a first high-level voltage through the logic output terminal, and the driving circuit 2 outputs a second high-level voltage to the power switch SW1 through the driving output terminal according to the first high-level voltage. Consequently, the gate-source voltage Vgs of the power switch SW1 is pulled high to drive the power switch SW1 to be turned on in advance. Therefore, the energy loss of the power switch SW1 operated in the third quadrant is reduced.

In some embodiments, in order to enhance the accuracy of the logic circuit 4*a* in driving the power switch SW1 to be turned on in advance for avoiding malfunction, the logic circuit 4*a* can further determine whether the drain-source voltage Vds of the power switch SW1 drops from a positive voltage to zero. When the logic circuit 4*a* determines that the drain-source voltage Vds of the power switch SW1 is dropped from the positive voltage to zero and determines that the drain-source voltage Vds of the power switch SW1 is also less than zero, the logic circuit 4*a* outputs the first high-level voltage through the logic output terminal. Accordingly, the driving circuit 2 outputs the second high-level voltage to the power switch SW1 through the driving output terminal according to the first high-level voltage. Consequently, the gate-source voltage Vgs of the power switch SW1 is pulled high to drive the power switch SW1 to be turned on in advance.

In some embodiments, the logic circuit 4*a* includes a comparator 42, a first SR latch device 43, a first AND gate 44, an OR gate 45, an inverter 46, a second AND gate 47, a second SR latch device 48 and a delaying comparator 49. The input terminal of the delaying comparator 49 is configured to receive the PWM signal and configured as the second logic input terminal. The inverting input terminal of the comparator 40 is electrically connected to the output terminal of the current source CS and configured as the first logic input terminal of the logic circuit 4*a*. The non-inverting input terminal of the comparator 40 is electrically connected to the reference voltage source Vref. The reference voltage source Vref is electrically connected between the non-inverting input terminal of the comparator 40 and the source S of the power switch SW1. The setting terminal S1 of the first SR latch device 43 is electrically connected to the output terminal of the comparator 42. The first input terminal of the first AND gate 44 is electrically connected to the output terminal Q of the first SR latch device 43. The first input terminal of the OR gate 45 is electrically connected to the output terminal of the delaying comparator 49, the resetting terminal R of the first SR latch device 43 and the resetting terminal R of the second SR latch device 48. The OR gate 45 is configured to receive the PWM signal through the delaying comparator 49. The second input terminal of the OR gate 45 is electrically connected to the output terminal of the first AND gate 44. The output terminal of the OR gate 45 is electrically connected to the driving input terminal of the driving circuit 2 and configured as the logic output terminal. The input terminal of the inverter 46 is electrically connected to the detecting terminal 30, and the voltage on the input terminal of the inverter 46 is marked as the second voltage B. The first input terminal of the second AND gate 47 is electrically connected to the input terminal of the inverter 46, and the second input terminal of the second AND gate 47 is electrically connected to the output terminal of the inverter 46. The setting terminal S1 of the second SR latch device 48 is electrically connected to the output terminal of the second AND gate 47, and the output terminal of the second SR latch device 48 is electrically connected to the second input terminal of the first AND gate 44.

In some embodiments, a negative voltage detection trigger circuit is formed by the cooperation of the comparator 42 and the first SR latch device 43. The negative voltage detection trigger circuit is configured to determine whether the drain-source voltage Vds of the power switch SW1 is less than zero through the detecting voltage Vdetect of the detecting terminal 30. When the negative voltage detection trigger circuit determines that the drain-source voltage Vds of the power switch SW1 is less than zero, the negative voltage detection trigger circuit outputs a high-level voltage to the first input terminal of the first AND gate 44. A drop detection trigger circuit is formed by the cooperation of the inverter 46, the second AND gate 47 and the second SR latch device 48. The drop detection trigger circuit is configured to determine whether the drain-source voltage Vds of the power switch SW1 is dropped from a positive voltage to zero. When the drop detection trigger circuit determines that the drain-source voltage Vds of the power switch SW1 is dropped from the positive voltage to zero, the drop detection trigger circuit outputs a high-level voltage to the second input terminal of the first AND gate 44. When the output terminal of the first AND gate 44 outputs the high-level voltage due to the first input terminal and the second input terminal of the first AND gate 44 output the high-level voltages respectively and when the PWM signal is a low-level voltage, the OR gate 45 outputs the first high-level voltage. Accordingly, the driving circuit 2 outputs the second high-level voltage to the power switch SW1 through the driving output terminal according to the first high-level voltage. Consequently, the gate-source voltage Vgs of the power switch SW 1 is pulled high to drive the power switch SW1 to be turned on in advance. Therefore, the energy loss of the power switch SW1 operated in the third quadrant is reduced. When the PWM signal is a high-level voltage, the first SR latch device 43 and the second SR latch device 48 are reset.

In summary, the present disclosure provides a power conversion system. The power conversion system includes a voltage detection circuit and a logic circuit. When the logic circuit determines that the drain-source voltage of the power switch is less than zero through the detecting terminal of the voltage detection circuit, the logic circuit outputs the first high-level voltage. Accordingly, the driving circuit outputs the second high-level voltage to the power switch according to the first high-level voltage. Consequently, the gate-source voltage of the power switch is pulled high. When the reverse current flows from the source to the drain of the power switch, the energy loss of the power switch due to the drain-source voltage of the power switch in power conversion system operated at high frequency is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system, comprising:

a power switch;

a driving circuit comprising a driving input terminal and a driving output terminal, wherein the driving output terminal is electrically connected to a gate of the power switch and configured to output a control signal to control the operation of the power switch;

a voltage detection circuit electrically connected to a drain of the power switch and a voltage source and comprising a current source, a detecting switch and a detecting terminal, wherein the current source is electrically connected between the voltage source and the detecting terminal and configured to output a detecting current along a direction toward the detecting terminal, and the detecting switch is electrically connected between the detecting terminal and a drain of the power switch; and a logic circuit electrically connected to the current source, the detecting terminal, the driving circuit and a source of the power switch and comprising a first logic input terminal, a second logic input terminal and a logic output terminal, wherein the first logic input terminal is electrically connected to the current source, the second logic input terminal is configured to receive a PWM signal, and the logic output terminal is electrically connected to the driving input terminal, wherein the logic circuit is configured to determine whether a drain-source voltage of the power switch is less than zero through the detecting terminal, and the logic circuit outputs a first high-level voltage through the logic output terminal when the drain-source voltage of the power switch is less than zero, wherein the driving circuit outputs a second high-level voltage to the power switch through the driving output terminal according to the first high-level voltage, so that a gate-source voltage of the power switch is pulled high.

2. The power conversion system according to claim 1, wherein the detecting switch comprises a diode, wherein a cathode of the diode is electrically connected to the drain of the power switch, and an anode of the diode is electrically connected to the detecting terminal.

3. The power conversion system according to claim 1, wherein the logic circuit comprises:

a comparator, wherein an inverting input terminal of the comparator is electrically connected to the current source and the detecting terminal and configured as the first logic input terminal, and a non-inverting input terminal of the comparator is electrically connected to a reference voltage source; and an OR gate, wherein a first input terminal of the OR gate is configured to receive the PWM signal and configured as the second logic input terminal, a second input terminal of the OR gate is electrically connected to an output terminal of the comparator, and an output terminal of the OR gate is electrically connected to the driving input terminal of the driving circuit and configured as the logic output terminal.

4. The power conversion system according to claim 1, wherein the power switch, the driving circuit, the voltage detection circuit and the logic circuit are integrated as a system on chip or a system in package.

5. The power conversion system according to claim 1, wherein when the second high-level voltage is equal to a voltage of the voltage source, the power switch is turned on completely, wherein when the second high-level voltage is between a threshold voltage of the power switch and the voltage of the voltage source, the power switch is half-conducted.

6. The power conversion system according to claim 1, wherein the power conversion system further comprises an on-resistance monitoring circuit, the one-resistance monitoring circuit is electrically connected to the detecting terminal of the voltage detection circuit and the source of the power switch and configured to monitor an on-resistance of the power switch when the power switch is operated in a first quadrant.

7. The power conversion system according to claim 6, wherein the on-resistance monitoring circuit comprises:

a resistor, wherein a first terminal of the resistor is electrically connected to the source of the power switch, and a second terminal of the resistor is electrically connected to the ground; and a divider, wherein a first terminal of the divider is electrically connected to the detecting terminal of the voltage detection circuit, a second terminal of the divider is electrically connected to the second terminal of the resistor, and an output terminal of the divider is configured to output an output signal which reflects the on-resistance of the power switch.

8. The power conversion system according to claim 1, wherein the detecting switch comprises a MOSFET, a gate of the MOSFET is electrically connected to the gate of the power switch, a drain of the MOSFET is electrically connected to the drain of the power switch, and a source of the MOSFET is electrically connected to the detecting terminal.

9. The power conversion system according to claim 1, wherein the logic circuit is configured to further determine whether the drain-source voltage of the power switch is dropped from a positive voltage to zero, wherein when the logic circuit determines that the drain-source voltage of the power switch is dropped from the positive voltage to zero and determines that the drain-source voltage of the power switch is less than zero, the logic circuit outputs the first high-level voltage through the logic output terminal, wherein the driving circuit outputs the second high-level voltage to the power switch according to the first high-level voltage.

10. The power conversion system according to claim 1, wherein the logic circuit comprises:

a comparator, wherein an inverting input terminal of the comparator is electrically connected to the current source and configured as the first logic input terminal, and a non-inverting input terminal of the comparator is electrically connected to a reference voltage source;

a first SR latch device, wherein a setting terminal of the first SR latch device is electrically connected to an output terminal of the comparator;

a first AND gate, wherein a first input terminal of the first AND gate is electrically connected to an output terminal of the first SR latch device;

an inverter, wherein an input terminal of the inverter is electrically connected to the detecting terminal;

a second AND gate, wherein a first input terminal of the second AND gate is electrically connected to the input terminal of the inverter, and a second input terminal of the second AND gate is electrically connected to an output terminal of the inverter;

a second SR latch device, wherein a setting terminal of the second SR latch device is electrically connected to an output terminal of the second AND gate, and an output terminal of the second SR latch device is electrically connected to a second input terminal of the first AND gate;

a delaying comparator, wherein an input terminal of the delaying comparator is configured to receive the PWM signal and configured as the second logic input terminal; and an OR gate, wherein a first input terminal of the OR gate is electrically connected to an output terminal of the delaying comparator, a resetting terminal of the first SR latch device and a resetting terminal of the second SR latch device, the OR gate is configured to receive the PWM signal through the delaying comparator, a second input terminal of the OR gate is electrically connected an output terminal of the first AND gate, and an output terminal of the OR gate is electrically connected to the driving input terminal of the driving circuit and configured as the logic output terminal.

* * * * *